United States Patent [19]

Seilenbinder

[11] 4,181,206

[45] Jan. 1, 1980

[54] BACK-UP SAFETY SYSTEM FOR MACHINE HAVING ROTATABLE PART DECLUTCHED BY DEAD MAN CONTROL

[75] Inventor: Richard W. Seilenbinder, Milwaukee, Wis.

[73] Assignee: Briggs & Stratton Corporation, Wauwatosa, Wis.

[21] Appl. No.: 871,542

[22] Filed: Jan. 23, 1978

[51] Int. Cl.[2] ........................ A01D 53/00; F16D 67/02

[52] U.S. Cl. ............................. 192/0.084; 192/0.058; 192/0.094; 192/129 A; 56/10.5

[58] Field of Search .................... 56/10.5; 123/148 S; 192/0.084, 0.094, 0.096, 0.058

[56] References Cited

U.S. PATENT DOCUMENTS

| | | | |
|---|---|---|---|
| 3,736,729 | 6/1973 | Peterson | 56/10.5 |
| 3,955,653 | 5/1976 | Comer | 56/10.5 X |
| 3,969,875 | 7/1976 | Nofel | 56/10.5 X |
| 4,062,135 | 12/1977 | Dobberpuhl | 192/129 A X |

*Primary Examiner*—Benjamin Wyche

*Attorney, Agent, or Firm*—Ira M. Jones

[57] ABSTRACT

A back-up safety system stops the engine of a machine such as a power mower upon failure of a main safety system whereby release of a dead man control normally declutches a work performing member from the engine and brakes it to a stop while the engine continues to run. The back-up safety system comprises a switch that is closed upon release of the dead man control, in series with an SCR in a magneto grounding circuit. The SCR is gated on by a sensor comprising a biasing coil connected with the SCR, a ferromagnetic rotor constrained to rotate with the work performing member and having circumferentially spaced pole projections, a permanent magnet, and a core with which the coil is coupled and which cooperates with the rotor and magnet to define a magnetic circuit wherein flux density varies as rotor projections pass a pole face on the core.

5 Claims, 4 Drawing Figures

13
12
14
5
7
8
16
11
11
9
6

M
16
26
28
25
25'
24
23
22
27
29
47
46
45
31
17
32
19
20
21
18
30
33

7
8
15
50
51
49
17
4
4
6
33
40
50
48

34
31
36
39
17
38
40
37
42
41
32
35
33

BACK-UP SAFETY SYSTEM FOR MACHINE HAVING ROTATABLE PART DECLUTCHED BY DEAD MAN CONTROL

This invention relates to safety systems for machines such as power lawn mowers, wherein a rotatable work performing member that is normally driven for rotation by an internal combustion engine and is potentially dangerous when rotating is connected with the engine through a clutch that remains engaged only while a dead man control element is manually held in an operating position and is declutched from the engine and braked upon release of the dead man control element; and the invention is more specifically concerned with a back-up safety system for such a machine whereby the engine is stopped if the work performing member should continue to rotate after release of the dead man control element.

The present invention is applicable to many types of engine-powered machines having potentially dangerous work performing members that should be brought to a stop when an operator of the machine leaves a position from which he normally controls it. A rotary power lawn mower is a familiar machine that exemplifies the problem solved by the invention, and therefore the invention is described herein as embodied in a power lawn mower. It will be understood, however, that this is merely for purposes of illustration and example, and that the problem exists with other types of machines (e.g. snow blowers), to all of which the invention can be readily and advantageously applied.

On a rotary power lawn mower, the sharp, rapidly revolving cutting blade is enclosed in a skirted deck. The decks of all such mowers that have been manufactured in recent years have been carefully designed to prevent any possibility that a person using the mover in a normal manner will come into contact with the rotating blade. But, notwithstanding numerous and conspicuous warnings and the very obvious danger involved, the operators of such machines occasionally try to poke a hand or a foot into the clipping outlet to clean it, or try to raise or tilt the mower by lifting the lower edge of the deck, only to encounter the spinning blade with tragic consequences.

It is evident that such accidents can be prevented if the blade is caused to stop turning almost immediately after an operator leaves a normal operating position behind the handle of the mower, so that by the time he brings a hand or foot near its orbit the blade will no longer endanger him. Such stopping of the blade can be effected by means of a dead man control which requires that the operator maintain a grip upon a lever or the like on the mower handle in order for the blade to remain in rotation.

If such a dead man control were connected with the engine itself, to stop the engine at each release of the dead man control, the engine would have to be restarted after almost every such release. To avoid this annoyance, several proposals have been advanced for connecting the dead man control element with a combined clutch and brake which is so arranged that when the operator releases his grip on the mover handle, the blade is declutched from the engine and is engaged by a brake that quickly brings it to a stop. The engine, of course, keeps running; hence, when the operator returns to his control position, he can re-engage the clutch and thus cause the blade to resume its engine-driven rotation. As examples of such arrangements reference can be made to U.S. Pat. Nos. 2,985,992 to Dowdle, 3,247,654 to Nemeth et al, 3,871,159 to Shriver and 3,837,450 to Malion et al, and to the copending Harkness et al application, Ser. No. 830,116, filed Sept. 2, 1977, which has a common assignee herewith.

Whatever may be the inherent merits and advantages of any particular safety system of this type, and however carefully it may be manufactured, there is no reason to believe that it will be infallible, because perfect reliability simply cannot be attained in a mechanical device. And this ever-present possibility of failure in itself creates a hazard. When a machine is equipped with a safety device that overcomes the need for certain operating precautions, a user of the machine comes to rely upon the safety device and no longer observes those precautions. As a result, any failure of the safety device is likely to cause the very accident that it was intended to avert.

One general object of the present invention is to provide a back-up safety system for a blade declutching and braking device of the above-described character, whereby blade rotation is stopped within a fairly short time after the dead man control element has been released, even though the primary safety system has failed to stop the blade.

The attainment of this objective posed certain problems that did not have obvious solutions. The threshold problem was how to stop rotation of the blade when the mechanism that was intended to stop it had failed to do so. This problem is complicated by the fact that continued rotation of the blade may be due either to failure of the clutch to disengage or to failure of the brake.

According to the present invention, if the primary safety system does not stop rotation of the blade promptly after the dead man control element is released, then the engine is stopped. If the clutch has failed to disengage, stopping the engine will stop the blade; and if the clutch has disengaged but the brake has failed, then stopping the engine will enable the operator to hear and feel that the blade is still spinning, so that he will be warned of danger. With blade declutching and braking mechanisms that are most likely to be used commercially, failure of the blade to stop is most often due to failure of the clutch to disengage, and therefore stopping the engine will usually result in positive stopping of the blade.

The engine obviously should not be stopped unless the primary safety system has failed, and obviously the primary safety system cannot bring the blade to an instantaneous stop immediately upon release of the dead man control element. Therefore, the back-up system should become effective if the blade continues to rotate for more than a short time after the primary safety device has been brought into application, but not until that short time has expired. Furthermore, the back-up system must not come into operation at any time that the blade is rotating in response to a proper grip on the mower handle, so that the back-up system does not interfere with normal use of the mower.

It is also necessary for the back-up system to include a sensor that detects whether or not the blade is in rotation. That sensor must obviously function in an extremely unfavorable environment, characterized by an abundance of flying grass clippings and dirt, severe vibration, frequent high humidity, a wide range of ambient temperatures, and occasional drenchings with water, oil or gasoline—in addition to which the sensor can be expected to receive no maintenance. Notwithstanding these demands, the sensor must be extremely compact, reasonably light in weight, very inexpensive, and absolutely reliable. Needless to say, all other components of the back-up system, individually and in combination, must meet all of these same requirements. Furthermore, since the back-up system must be at least as reliable as the primary safety system, it should be very simple and should not include any components that are subject to wear or deterioration.

With the above-stated considerations in mind, it is the general object of the present invention to provide a highly reliable but very compact and inexpensive back-up safety system for cooperation with a primary safety system whereby release of a dead man control causes a rotatable work performing member to be declutched from its driving engine and braked, said back-up safety system being arranged to stop the engine in the event the member continues to rotate after release of the dead man control.

Another and more specific object of the invention is to provide a reliable back-up safety system of the character described which stops the engine only if the rotatable member is not braked to a stop within a short time after a dead man control is released, but which does not bring the engine to a stop if the rotatable member is stopped within said short time and does not interfere with engine operation while the dead man control is maintained in an operating position.

It is also a specific object of the invention to provide a back-up safety system of the character described that does not interfere with normal starting of an engine if a rotatable member to be driven by the engine does not rotate while the engine is being started, but does prevent the engine from running if the rotatable member is drivingly coupled to the engine during starting.

A further specific object of the invention, the significance of which is explained hereinafter, is to provide a back-up safety system of the character described that stops the engine by grounding its ignition magneto and is effective to maintain the magneto grounded whenever the blade is rotating under circumstances such that the engine should be stopped.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate one complete example of an embodiment of the invention constructed according to the best mode so far devised for the practical application of the principles thereof, and in which.

Figure 1:
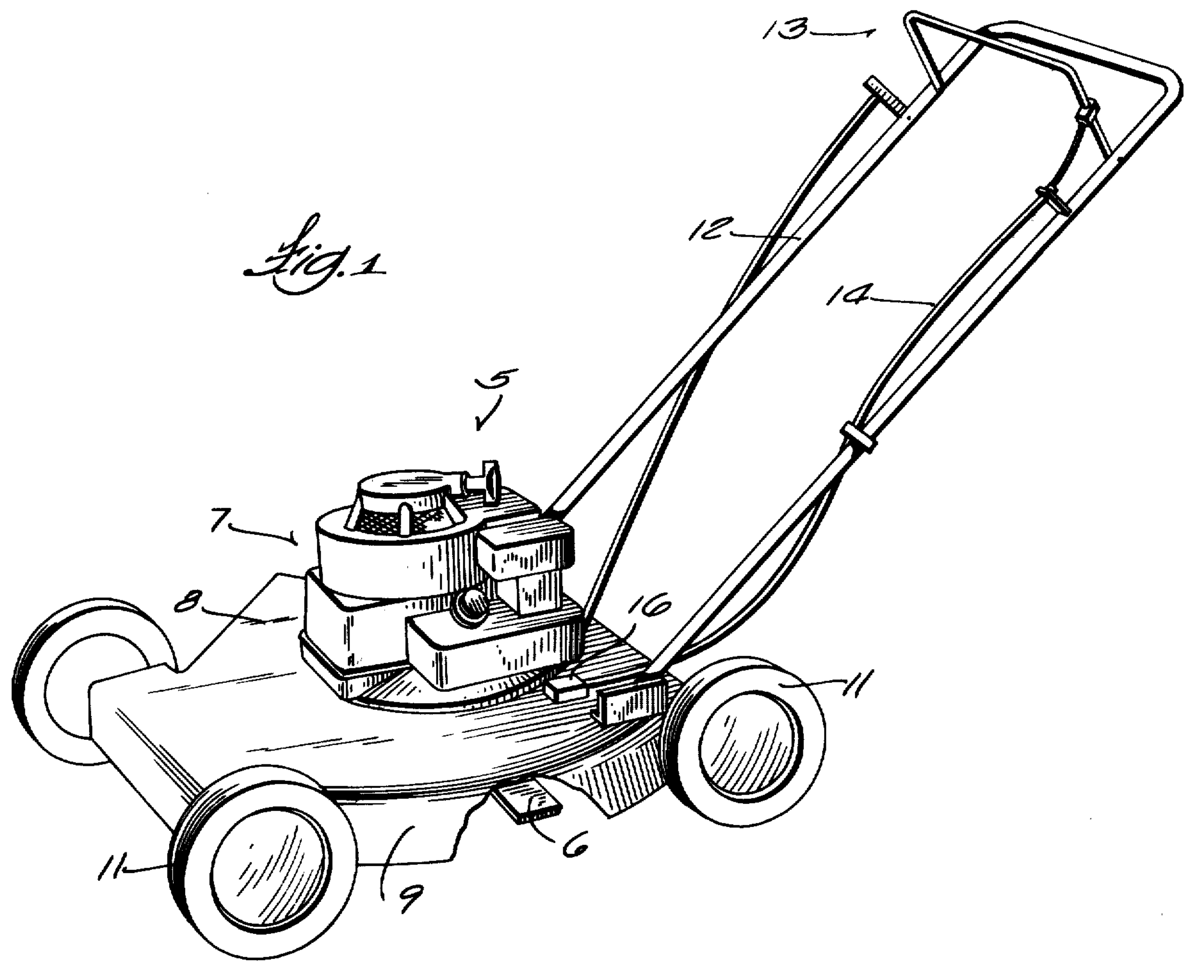
FIG. 1 is a more or less diagrammatic view of a rotary power lawn mower powered by an internal combustion engine and equipped with a primary safety device by which the mower blade is declutched from the engine and braked upon release of a dead man control element, and also equipped with a back-up safety system embodying the principles of this invention.

Referring now to the accompanying drawings, the numeral 5 designates generally a rotary power lawn mower having a horizontally extending cutting blade 6 that rotates about a vertical axis and is driven for rotation by means of an internal combustion engine 7. The engine is mounted on top of a deck 8 that overlies the blade, and the vertically oriented crankshaft of the engine (which is not shown) projects down through the deck to be drivingly connected with the blade. A skirt 9 projects down from the deck to a level below the blade and completely surrounds the blade except at a clipping outlet opening (not shown) at one side of the mower. The deck is mounted on wheels 11, and a handle 12 that projects upwardly and rearwardly from the deck is held by an operator for guiding the mower.

Mounted on the handle 12 of the mower is a dead man control element 13, shown as a U-shaped lever that is biased to a released position in which it projects upwardly from the mower handle. For mowing, the operator swings the U-shaped lever 13 down to an operating position in which it closely overlies the handle 12. Through a bowden cable 14 or the like, the dead man control lever 13 is connected with a combined clutch and brake mechanism 15 whereby the blade 6 is drivingly coupled to the engine 7 as long as the lever 13 is held in its operating position but is declutched from the engine and braked to a stop upon release of the lever 13. As pointed out above, several mechanisms are known by which declutching and braking of a mower blade can be effected in consequence of release of a dead man control element, and therefore details of that safety mechanism are not disclosed.

Figure 2:
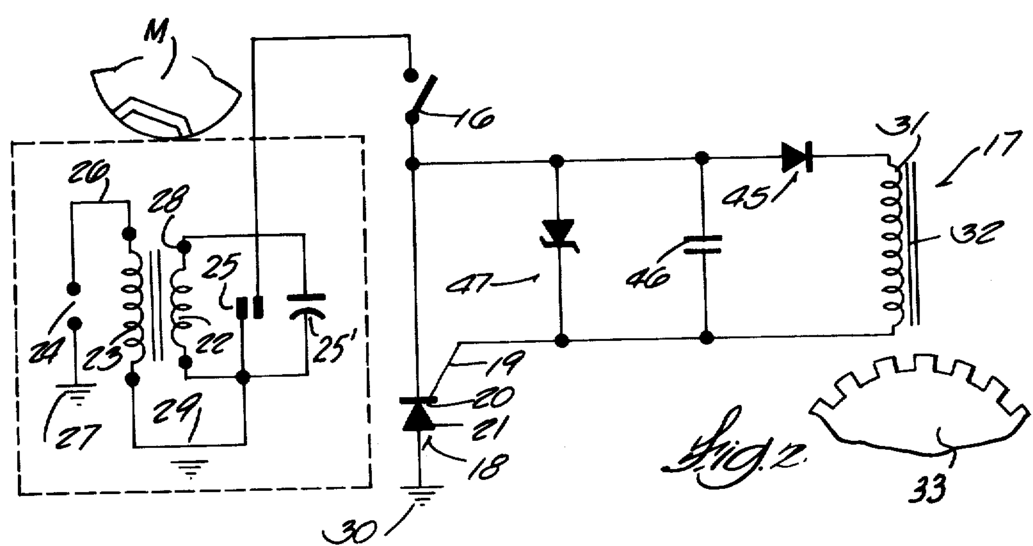
FIG. 2 is a circuit diagram for the back-up safety device of this invention.

The back-up safety system of this invention stops the engine 7 if the blade 6 fails to stop rotating within a reasonably short time after release of the dead man control lever 13. In general, as best seen from FIG. 2, the back-up safety system comprises a normally closed switch 16 that is actuated by the dead man control lever 13, a blade rotation sensor 17 that can produce a small current output whenever the blade is in rotation, and a silicon controlled rectifier (SCR) 18 that has its gate terminal 19 connected with the sensor 17 and has its anode 20 and the cathode 21 connected in a magneto grounding circuit in series with the normally closed switch 16.

The switch 16 can be of the pushbutton type, so mounted in relation to the dead man control lever 13 as to have its pushbutton depressed by movement of that lever to its operating position; hence the switch 16 is open whenever the lever 13 is maintained in its operating position and is closed whenever that lever is released.

The safety apparatus comprising the switch 16 and SCR 18 is intended for cooperation with a flywheel magneto ignition system such as is more or less conventional on small engines, comprising a primary winding 22 and a secondary winding 23 that are inductively coupled with one another, a spark plug 24 connected across the terminals of the secondary winding, and engine operated breaker points 25 connected across the terminals of the primary winding. As is customary, a condenser 25' is connected across the points 25. During a portion of the engine cycle that precedes the instant when the spark plug 24 is to be fired, the primary winding 22 is short circuited by closure of the breaker points 25, so that current generated by the rotation of the magnets M of the ignition system can flow in the primary; but at the instant of ignition the breaker points open for abrupt termination of such current flow, thereby inducing across the secondary winding 23 a high voltage that effects firing of the spark plug 24. As is well known, firing of the spark plug cannot occur if short-circuiting of the primary winding continues past the time at which ignition should occur. With the apparatus of this invention the engine is stopped, when necessary, by such continued short-circuiting of the primary winding.

In practice, the spark plug 24 is connected with one terminal of the secondary winding 23 by means of a so-called high tension lead 26, while the other secondary terminal and the spark-plug are grounded, as at 27, to complete the high voltage circuit through the metal of the engine body. In like manner, one terminal 28 of the primary winding 22 is connected with an ungrounded one of the breaker points 25, while the other terminal of the primary winding and the other breaker point are grounded as at 29. The ungrounded primary terminal 28 is connected in series with the normally open switch 16 and the SCR 18; and the SCR, in turn, is grounded as at 30. Hence the engine cannot run if the switch 16 is closed and the SCR 18 is conducting through the time when the spark normally occurs, because the primary winding is then short-circuited. Conversely, the engine can run at any time the lever 13 is in its operating position, so that the switch 16 is in its open condition and the primary winding cannot be short-circuited through it.

The condition of the SCR—whether it is conducting or non-conducting—depends upon whether or not the sensor 17 is producing an output in response to rotation of the blade 6. Since the SCR cannot conduct when the blade is stationary, the engine can run even though the lever 13 is released and the switch 16 is closed, provided the blade 6 is declutched from the engine and is stopped. Consequently, if the primary safety system is operating properly, the engine can be started without the need for holding the lever 13 in its operating position.

Figure 3:
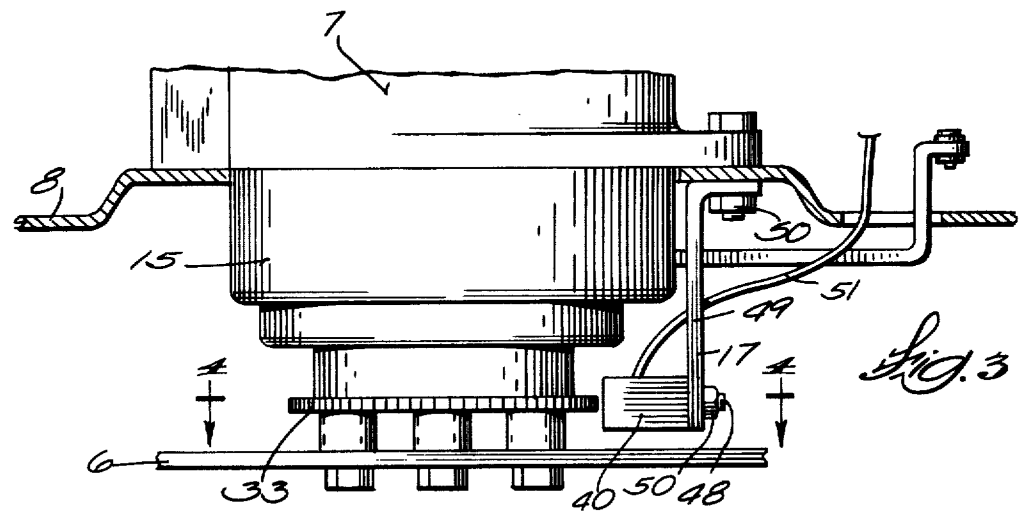
FIG. 3 is a fragmentary view in vertical section, on an enlarged scale, taken through a central portion of the deck of the mower shown in FIG. 1 and illustrating the apparatus of this invention.

The sensor 17, as best seen in FIG. 3, comprises, in general, a coil 31 that is inductively coupled with a ferromagnetic core 32, a ferromagnetic rotor 33 that is constrained to rotate with the blade 6 and has a ridged or toothed periphery 34, and a permanent magnet 35 that is in a magnetic circuit with the core 32 and the peripheral portion of the rotor.

As shown, the coil 31, the core 32 and the permanent magnet 35 are enclosed in a generally cup-shaped housing 40 that has a cylindrical exterior and has a substantially deep well opening to its front end. The housing can be a unitary plastic molding, as shown, or can be of magnetically permeable steel. In the outer or front portion of the well in the housing, and coaxial with it, is the core 32, which is more or less mushroomshaped, with a flat head 36 from which an integral stem portion 37 projects forwardly. In the case of the illustrated plastic housing, the diameter of the head portion 36 of the core is substantially equal to the inside diameter of the housing, and its stem portion 37 is surrounded by the coil 31. The front end of the stem portion, which is substantially coplanar with the front edge of the housing 40 and defines a pole face 42 on the core, is separated from the ridged peripheral portion 34 of the rotor by only a small clearance space. Forwardly of the head portion 36 of the core, the well in the housing can be filled with potting compound 38 to secure the coil and core in place and to seal the assembly against dirt and moisture.

In the interior of the housing 40 there is a forwardly facing circumferential shoulder 39 that is spaced behind the head portion 36 of the core and is defined by a reduced diameter rear portion of the well in the housing. Between that shoulder and the head portion 36 is confined the permanent magnet 35, which is cylindrical and has its poles at its opposite axial ends, so that one pole surface of the magnet flatwise abuts the rear surface of the head portion 36. The portion of the housing interior that is behind the magnet 25 can provide an enclosure for the SCR 18 and other electronic components described hereinafter.

If the housing 40 is of magnetically permeable material, the diameter of the head 36 of the mushroom shaped coil core should be substantantially smaller than the inside diameter of the housing (e.g. about two-thirds of the inner diameter of the housing), and preferably the permanent magnet 35 should also have a diameter smaller than the inside diameter of the front portion of the housing, to thus space the coil core head 36 and the magnet 35 from the cylindrical side wall of the housing and prevent short circuiting of the flux path through that side wall. With the housing thus included in the magnetic circuit, the magnet would not have to be as powerful as in the case of the illustrated plastic housing, wherein there is a substantially large air gap in the magnetic circuit. With a steel housing, the coil 31 is bonded to the housing, as by means of potting material, and the core head 36 is maintained concentric to the housing by reason of the stem portion 37 of the core being closely surrounded by the coil.

The rotor 33 is constrained to rotate with the blade and can comprise a flat disc concentrically overlying the central portion of the blade but spaced above the blade by a small distance. Each of the tooth-like ridges or projections 41 on the peripheral portion 34 of the rotor transiently aligns with the core 32 as the projection moves through the portion of its orbit at which the core is located. The width of each projection 41, as measured circumferentially of the rotor, is substantially equal to that of the pole face 42 on the core, and the several projections are spaced apart by uniform circumferential distances which are at least equal to that width. As will be seen, the projections 41 in effect constitute magnetic poles on the rotor.

Figure 4:
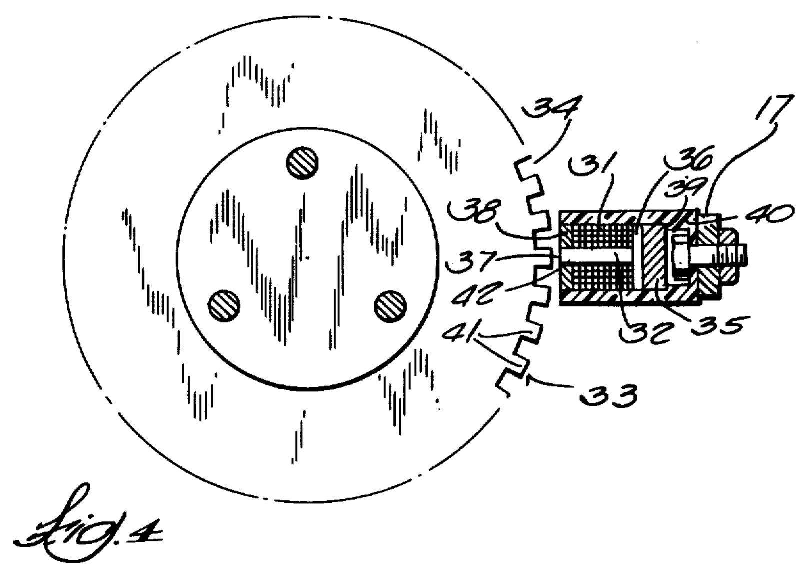
FIG. 4 is a view in horizontal section taken on the plane of the line 4—4 in FIG. 3.

The magnetic circuit linked with the coil 31 can be traced from the magnet 35 through the stem portion 37 of the core, across a small air gap to the rotor 33, thence back, through a large air gap in the case of the illustrated plastic housing 40, to the opposite pole of the magnet 35. If the housing 40 is of ferrous metal, its cylindrical side wall is of such diameter that two rotor projections 41 can be aligned with diametrically opposite portions of that side wall at the same time that a third projection aligns with the stem portion 37 of the core, in the relationship shown in FIG. 4. In either case, as the rotor rotates, the reluctance of the magnetic circuit linked with the coil 31 alternately decreases and increases as projections 41 and the notches 43 between them successively come into alignment with the pole face 42 on the core, with the result that an alternating voltage is induced across the terminals of the coil 31. The coil terminals, in turn, are respectively connected with the gate terminal 19 of the SCR and with one of its other terminals.

One half-wave of the alternating voltage induced across the coil 31 is of the polarity to bias the SCR 18 into conductivity. Assuming that the switch 16 is closed and that there is a voltage of the proper polarity across the terminals of the primary winding 22 at the time this half-wave develops, the primary will be short-circuited through the SCR from and after the time the biasing voltage is developed, and for as long as there continues to be a voltage of the same polarity across the primary terminals, because, once gated on, an SCR continues to conduct as long as there is a continous forward voltage across its anode-cathode circuit.

With a flywheel magneto there is an interval in each engine cycle, following the time at which the spark is to occur, during which no e.m.f. is induced across the primary, and that interval is followed by a short period during which a voltage is induced across the primary that is of the polarity which is blocked by the SCR. Hence, the SCR must be gated on at a proper time during every engine cycle in which firing of the spark plug is to be prevented, because the plug will fire in any engine cycle during which the SCR is gated on only at a time or times when no forward current can flow through it. This means that one of the pole projections 41 on the rotor 33 should pass the pole face 42 on the core in properly timed relation to the engine cycle to prevent the spark plug from being fired. Since the rotor is not at all times constrained to rotate with the engine crankshaft, it is possible, with widely spaced projections 41 on the rotor, that the engine will fire intermittently as the blade decelerates through certain speeds after release of the dead man control lever 33. To prevent this, proper timing of SCR biasing can be ensured by providing the rotor 33 with numerous and rather closely spaced pole projections 41. However, the width of the pole face 42 on the core imposes a practical lower limit upon the circumferential width of the projections 41 and the notches 43 between them. In some cases, therefore, the pulses of biasing voltage may have to be prolonged, to ensure that the magneto primary will be short circuited through the SCR at the proper time in the engine cycle at all engine speeds. This can be accomplished by connecting a rectifier diode 45 in series with the coil 31, arranged to pass current in the direction to gate the SCR on, and connecting a capacitor 46 across the SCR biasing circuit. In effect the diode 45 and the capacitor 46 cooperate to convert the output of the coil 31 to half-wave rectified current with a substantial amount of ripple filtering.

Whether or not the diode 45 and capacitor 46 are used, the output of the coil 31 must be capable of affording adequate bias to the SCR at the lowest speeds of the rotor 33 as well as at its top speed. The coil is therefore designed to provide the required output at rotor speeds on the order of 30 rpm. To allow a small coil to be used, the SCR is preferably a sensitive one, capable of being gated on with a current of 10 to 20 milliamperes at ½ volt or less. Since the coil then tends to produce excessively high voltages for a sensitive SCR when the rotor is turning at normal blade speeds (3,000 to 3,500 rpm), a zener diode 47 is connected across the biasing circuit to limit SCR biasing voltage to a predetermined maximum value, typically 1.3 volts. As mentioned above, the SCR 18, the zener diode 47 and the rectifier diode 45 if it is used can be enclosed in the rear portion of the housing 40. The SCR and zener diode can be grounded to a mounting stud 48 that projects from the rear of the case to enable the assembly to be secured to a metal mounting bracket 49 by means of a lock nut 50 or the like.

The bracket 49 is secured in any suitable manner to the under side of the mower deck 8, above the blade and at one side of the clutch-brake mechanism 15. Since a ground connection is provided by the stud 48, through the bracket 49, only one conductor 51 need enter the case, for connection with the switch 16.

It will be apparent that the apparatus of this invention prevents the spark plug from firing whenever the dead man control lever 13 is released, and for as long as the blade continues to rotate. Since the blade cannot be stopped instantaneously, the engine always tends to stop under release of the dead man control lever. However, if the primary safety system is operating normally, stopping of blade rotation occurs within one to two seconds, whereas the engine—freed of the drag imposed upon it by the blade—requires four to five seconds to coast to a complete stop, due to the rotational inertia of its crankshaft and flywheel. Therefore, during normal operation of the primary safety system, the engine merely loses some speed as it coasts through several unfired cycles during deceleration of the blade; but as soon as the blade stops rotating, the ignition system resumes normal operation and the engine quickly comes back up to full speed. This behavior of the engine is of course very noticeable and informs the operator that both the primary safety system and the back-up system are functioning properly.

As pointed out above, the back-up safety system of this invention does not interfere with normal engine starting, provided the blade is declutched from the engine when the engine is being cranked, and even though the dead man control lever 13 is not being held in its operating position. However, if the clutch is stuck in its engaged position, attempts to start the engine will be unsuccessful, inasmuch as the rotor 33 will turn with cranking of the engine and the SCR 18 will conduct during each cranking cycle, preventing the spark plug from firing. This starting safety feature is a particularly important one, since an operator is especially likely to position his toes near the blade orbit when cranking the engine, and he would otherwise have no way of knowing of a failure of the primary safety system that caused the blade to rotate with the engine.

From the foregoing description taken with the accompanying drawings it will be apparent that this invention provides a back-up safety system for an engine powered machine having a potentially dangerous work-performing member that is declutched from the engine and braked to a stop when an operator leaves a safe position from which he normally controls the machine, said back-up system being arranged to stop the engine if the work performing member is not brought to a stop within a predetermined short time after release of a dead man control instrumentality but permitting the engine to remain in operation if the primary safety system functions in its intended manner.

Those skilled in the art will appreciate that the invention can be embodied in forms other than as herein disclosed for purposes of illustration.

The invention is defined by the following claims:

I claim:

1. In a machine comprising an internal combustion engine with a magneto ignition system wherein there is a grounding terminal that can be grounded for stopping the engine, a rotatable work performing member that is potentially dangerous when rotating, a clutch through which said work performing member can be rotatably driven by the engine and which can be disengaged to disconnect the work performing member from the engine, and a dead man control element biased to a released position and having a connection with said clutch whereby the clutch is engaged only while said dead man control element is maintained in an operative position against its bias, safety means for stopping the engine in the event the dead man control element is released and the work performing member continues to rotate, said safety means comprising:

A. a switch having open and closed conditions, said switch being
   (1) operatively associated with said dead man control element, and
   (2) arranged to be in its open condition when said dead man control element is in its operative position and to be in its closed condition when said dead man control element is in its released position;
B. a sensor operatively associated with said work performing member and arranged to produce an electrical output whenever said work performing member is rotating;
C. an electrical switching instrumentality of the type that has at least three terminals, one of which comprises a biasing terminal, and which is normally non-conducting but provides for conduction of current between two others of its terminals in response to flow of biasing current at its said one terminal, said one terminal being connected with said sensor; and
D. means connecting said grounding terminal, said switch and said two other terminals of the electrical switching instrumentality in a grounded series circuit whereby said grounding terminal is grounded when
   (1) said switch is in its closed condition and
   (2) biasing current from said sensor is flowing at said one terminal of the electrical switching instrumentality.

2. The machine of claim 1, further characterized by: said sensor comprising
   (1) a rotor constrained to rotate with the work performing member and having a concentric peripheral portion that is ferromagnetic and has projections at regular circumferential intervals therearound;
   (2) a permanent magnet;
   (3) a relatively stationary magnetic core element having a pole face adjacent to the orbit of said projections, said core element being arranged to cooperate with said permanent magnet and said peripheral portion of the rotor in defining a magnetic flux circuit that has a substantially regularly varying reluctance in consequence of rotation of the rotor; and
   (4) a coil inductively coupled with said core element and in which an e.m.f. is induced by variation of flux density in said magnetic circuit that results from variation in its reluctance.

3. The machine of claim 2, wherein said electrical switching instrumentality comprises a silicon controlled rectifier having a gate terminal which comprises said biasing terminal and which is connected with one terminal of said coil, and having one of its said two other terminals connected with the other terminal of said coil, further characterized by:
   (4) a capacitor connected across the terminals of said coil to be charged by current flowing in the coil that is of the polarity to turn on the silicon controlled rectifier, and
   (5) rectifier means so connected with said coil and said capacitor as to prevent flow of current of the opposite polarity in the circuit comprising the coil and the capacitor, so that biasing current of the first mentioned polarity can be available to the silicon controlled rectifier during a substantially major part of the time when the rotor is rotating.

4. The machine of claim 2, wherein said electrical switching instrumentality comprises a sensitive silicon controlled rectifier having a gate terminal which comprises said biasing terminal and which is connected with one terminal of said coil, and having one of its said two other terminals connected with the other terminal of said coil, further characterized by:
   a zener diode connected across the terminals of said coil and arranged to limit voltage across said coil, of the polarity to turn on said SCR, to a predetermined maximum value.

5. In a machine comprising an internal combustion engine with an ignition system that has a grounding terminal which can be grounded for stopping the engine, a rotatable work performing member that is potentially dangerous when rotating, a clutch through which said work performing member can be rotatably driven by the engine and which can be disengaged to disconnect the work performing member from the engine, and a dead man control element biased to a released position and having a connection with said clutch whereby the clutch is engaged only while said dead man control element is maintained in an operative position against its bias, safety means for stopping the engine in the event the dead man control element is released and the work performing member continues to rotate, said safety means comprising:

A. a rotor constrained to rotate with the work preforming member and having a ferromagnetic peripheral portion around which there are circumferentially spaced projections;
B. a relatively stationary core element which has a pole face adjacent to the peripheral portion of the rotor;
C. a permanent magnet arranged in a magnetic flux circuit with said core element and said peripheral portion of the rotor, for charging into said core element a magnetic flux that varies in density during rotation of the rotor as said projections pass said pole face;
D. a coil inductively coupled with said core element and in which an e.m.f. is induced by variations of flux density in said core element;
E. a silicon controlled rectifier having a gate terminal connected with one terminal of said coil and having a pair of other terminals, one of which is connected with the other terminal of said coil;
F. a switch having open and closed positions and arranged for cooperation with said dead man control element to be in its open condition when said control is in its operating position and to be in its closed condition when said control element is released; and
G. means connecting said ground terminal, said switch and said two other terminals of the SCR in series in a grounding circuit through which said grounding terminal is grounded when said switch is in its closed condition and the SCR is conducting.

* * * * *